Aug. 29, 1961     T. C. MARTIN ET AL     2,998,522
FOUR PI PROPORTIONAL GAS FLOW COUNTER
Filed Aug. 21, 1957     2 Sheets-Sheet 1
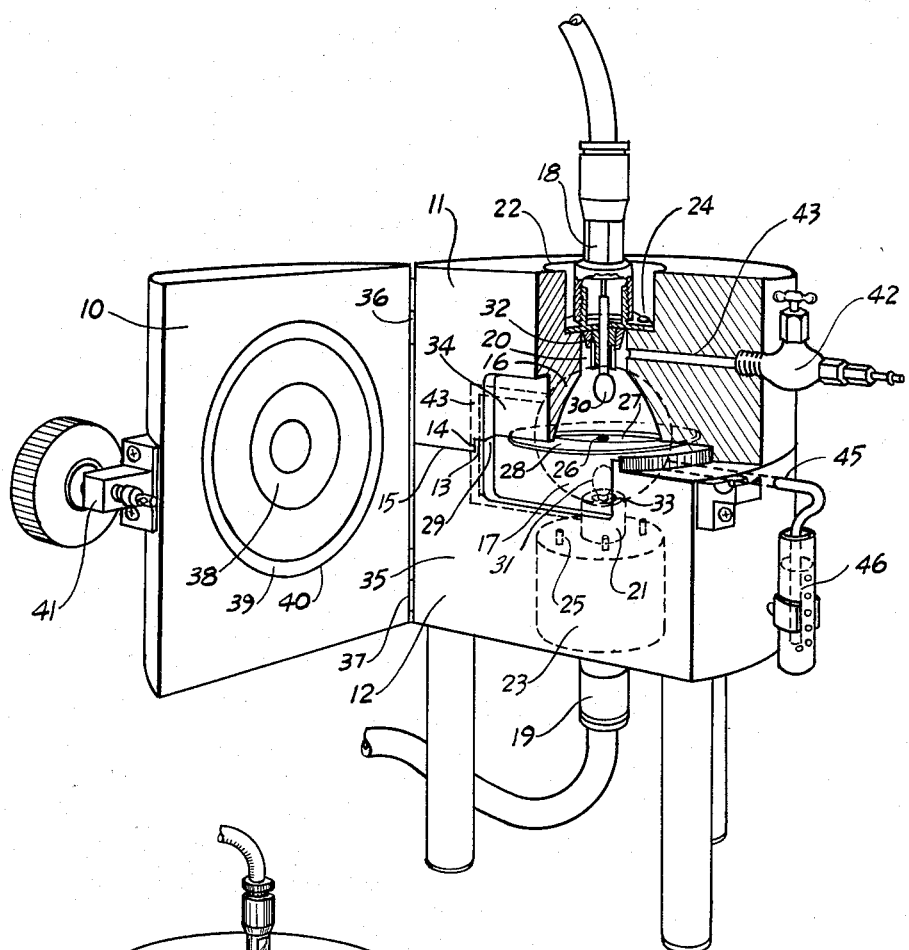
FIG_2
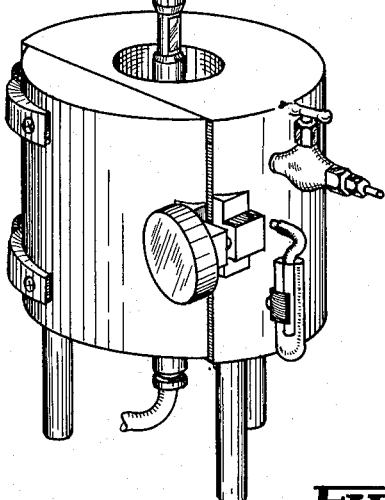
FIG_1
INVENTORS
TROY C. MARTIN
OTTIS E. GREEN
BY
Walter J. Jason
ATTORNEY.

Aug. 29, 1961 T. C. MARTIN ET AL 2,998,522
FOUR PI PROPORTIONAL GAS FLOW COUNTER
Filed Aug. 21, 1957 2 Sheets-Sheet 2
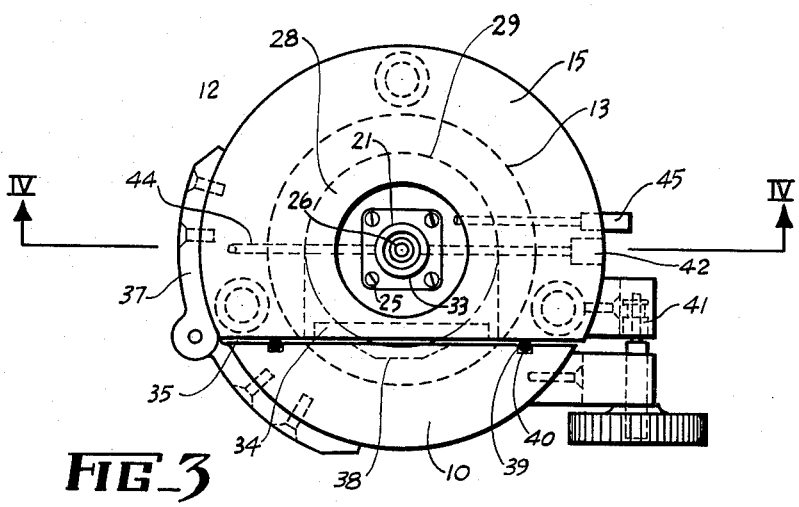
FIG_3
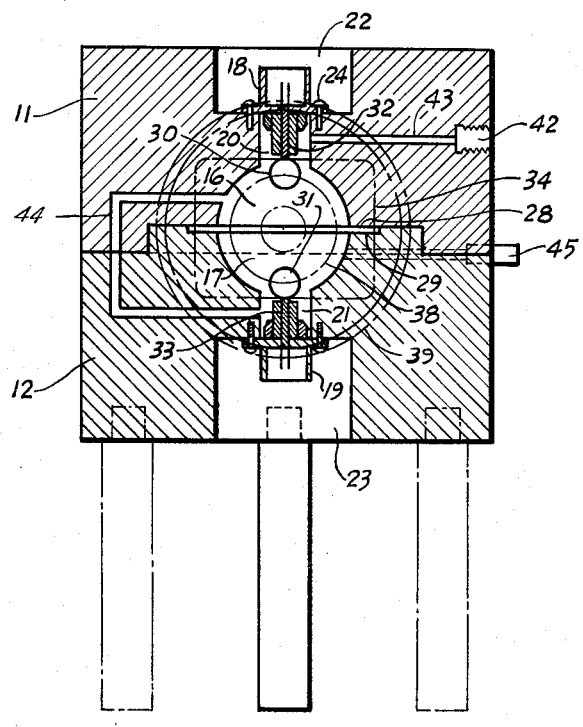
FIG_4
INVENTORS.
TROY C. MARTIN
OTTIS E. GREEN
BY
ATTORNEY.

United States Patent Office 2,998,522
Patented Aug. 29, 1961

2,998,522
FOUR PI PROPORTIONAL GAS FLOW COUNTER
Troy C. Martin, Fort Worth, and Ottis E. Green, Smithfield, Tex., assignors to General Dynamics Corporation, a corporation of Delaware
Filed Aug. 21, 1957, Ser. No. 679,333
4 Claims. (Cl. 250—83.6)

This invention relates to radioactivity counters and more particularly to four pi proportional gas flow counters adapted for production line techniques in testing radioactive samples.

Radioactive counters are operated as proportional counters in several geometries including the cylinder, hemisphere (two pi steradians) and sphere (four pi steradians) and are further characterized by being either an internal or external sample counter. The term "proportional counter" refers to the fact that the gas ions collected at the anodes form voltage pulses whose heights are proportional to the energy of the particles emitted by the radioactive sample being tested. Most cylindrical proportional counters are used as external sample counters, i.e., the radioactive sample is positioned outside the cylinder, while most two pi and four pi proportional gas flow counters are internal sample counters, i.e., the radioactive sample is introduced directly into the counting volume.

The present invention comprises a four pi counter wherein radioactive samples are placed in the center of a sphere. A constant gas flow is circulated through the sphere at a slow rate. Alpha or beta particles which are emitted by the sample ionize the gas and the resulting negative ions are collected at small wire anodes mounted at extremes on the sphere. The anodes are in a high voltage circuit in which the voltage pulses formed by the collection of the gas ions at the anodes are thus proportional to the energy of the radioactive particles producing the ionization in the gas.

The preferred embodiment emphasized convenient, safe and efficient "production line" testing of samples by providing easy insertion, testing and removal of the samples from the sphere. The sample is inserted through a slot and a gas-tight door quickly seals the sphere from leakage. After the test the door is opened, the sample is removed and replaced with another sample to be tested.

Formerly four pi gas flow counters were made so that one chamber or hemisphere was detachable for sample insertion and removal. This method of sample changing exposes two high voltage electrodes and is difficult, time consuming, and dangerous. Such methods of sample changing become tiring when used for "production line" counting and as a result are even more dangerous. Every time a sample change is made in this manner the operator risks contact with the high voltage anodes. In addition, cable trouble sometimes develops because of wear due to continued movement of the upper high voltage cable during sample changing.

An object of the present invention is to provide a safer, more efficient and trouble free radioactivity counter.

Another object is the provision of a gas flow radioacitvity counter wherein samples may be inserted and removed without exposing the high voltage electrodes.

Another object is the provision of a gas flow radioactivity counter wherein samples may be quickly and easily inserted and removed from test position.

Another object is the provision of a gas flow radioactivity counter requiring a minimum of test operation movements by the operator.

Other objects and features of the present invention will be readily apparent to those skilled in the art from the following specification and appended drawings wherein is illustrated a preferred form of the invention, and in which:

FIGURE 1 is a perspective view of the proportional counter,

FIGURE 2 is a perspective view of the proportional counter with the door open and a section of the counter cut away, FIGURE 3 is a top view of the counter and, FIGURE 4 is a cross section of a side view of the counter taken on line IV—IV of FIGURE 3.

Referring now to FIGURE 1 it can be seen that this device comprises a solid cylindrical member from which a longitudinal slice 10 has been cut to provide the door. This member may be any electrical conducting material that can be machined although the preferred embodiment is made from brass. As shown in FIGURE 2 the remaining solid is cut crosswise into two nearly equal sections 11 and 12 and a concentric circular aligning stud 13 and hold 14 machined into the said two sections. The stud and hold are not necessary however if other means for aligning the two sections are provided. The abutting surface 15 of both sections is polished and rubbed with vacuum wax to seal against leaks. Other methods of sealing are acceptable as long as they are gas tight. Aligned hollow hemispheres 16 and 17 are formed or machined into each of the sections 11 and 12. The connectors 18 and 19 are fitted into each chamber by some means such as the holes 20 and 21 and recesses 22 and 23 shown in FIGURE 4. The connectors 18 and 19 are shown bolted (24 and 25) to the upper and lower sections respectively. A gas inlet valve 42 is adapted for connection to an external gas supply and permits gas flow to the upper hemisphere through a gas inlet duct 43. An inner gas duct 44, better shown in FIG. 4, interconnects the upper and lower hemispheres and gas outlet 45 completes the gas passageway through the counter. A gas flow indicator is formed by extending outlet 45 down into a bubbler 46 filled with mineral oil. The gas rate of flow is controlled by the gas inlet valve 42. After the initial fast pre-flush a very slow rate of about two bubbles per second is recommended.

The small wire anodes 30 and 31 are generally operated at high voltages with respect to the connectors 18, 19 and brass cylinder which are electrically grounded. High voltage breakdown is prevented by the use of insulators 32 and 33 which are a part of the connectors 18 and 19. The source holder 28 is accessible through the recess 34 in the front face 35 of the counter. As shown in FIG. 3 the door 10, connected to section 11 and 12 by hinges 36 and 37 respectively, has a cutout or indenture 38 into which the source holder 28 protrudes as the door is closed. The counter is made gas tight by using an O-ring 39 set into an O-ring groove 40 in the door, the door being locked by the spring loaded latch mechanism 41. Other means for holding the door in position are acceptable, the only restriction again being a gas tight fit.

The radioactive sample 26 is mounted on a thin film or diaphragm 27. The diaphragm material should have a low absorption cross-section and be very thin to minimize the absorption of particles in their passage through the diaphragm. The diaphragm should also be a good electrical conductor to prevent the accumulation of static electrical charges. The preferred embodiment shown in FIGURE 2 utilizes an .001" aluminum foil diaphragm. A new diaphragm is required for each different determination that is made of the activity of a sample. The diaphragm is mounted on a circular do-nut or ring type holder 28 which fits into a recess 29 in the lower hemisphere. The holder 28 is an aluminum ring and may be used with several different diaphragms. After determining the activity of a solution evaporated onto a diaphragm, such diaphragm and the radio active material adhering to it are disposed of and the aluminum holder may then be used again.

In the use of the device the high voltage cables are connected to a surce of high voltage and the brass counter is at ground. The sample to be tested is inserted by opening the door and sliding the holder into the recess 29. The door is closed and the gas inlet valve adjusted for a fast pre-flush rate. Any of the several known counting gases may be used, a typical one being methane. After pre-flushing for a given period of time the gas inlet valve 42 is adjusted for a very slow rate (about two bubbles per second) and the counting can be started. The gas ions (negatively charged gas atoms or molecules) are produced by particles emitted by the test sample. The ions are collected by the anodes which are at a high positive potential. A means for counting the voltage pulses (resulting from the collection of gas ions at the anodes) is provided. These counting circuits are many and varied and well known in the art.

After the desired number of total counts have been recorded the voltage is reduced somewhat to prevent arcing when the door is opened, the door is then opened and the sample removed. Other samples may then be counted. When not in use the gas inlet valve should be closed and the high voltage set at a lower value.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A four pi proportional gas flow counter comprising a housing formed from electrically conducting material having a spherical counting chamber therein, a pair of spaced apart anodes supported within said chamber by connectors, said connectors being electrically insulated from said anodes and attached to said housing, means for electrically grounding said housing and said connectors, means including said connectors for attaching said anodes to a high voltage source, a diaphragm positioned within said chamber between said anodes, said diaphragm substantially bisecting said chamber into an upper hemispheric portion and the lower hemispheric portion, a gas inlet regulating valve and duct for conducting a regulated flow of gas through said housing to said upper hemispheric portion, a gas duct within said housing for passing said gas from said upper hemispheric portion to said lower hemispheric portion, a gas outlet duct for carrying said gas away from said lower hemispheric portion, and a door attached with a gas tight fit to said housing permitting access to and replacement of said diaphragm.

2. A four pi proportional gas flow counter comprising a housing formed from electrically conducting material having a spherical counting chamber therein, a pair of spaced apart anodes supported within said chamber by connectors, said connectors being electrically insulated from said anodes and attached to said housing, means for electrically grounding said housing and said connectors, means including said connectors for attaching said anodes to a high voltage source, a diaphragm supported within said chamber between said anodes by a ring shaped holder, said diaphragm and said ring partitioning said chamber into an upper hemispheric portion and a lower hemispheric portion, a recess encircling the spherical inter-surface of said chamber for supporting said ring shaped holder, a slot in said housing communicating with said recess in said chamber to facilitate removal of said ring shaped holder from said chamber while substantially maintaining the integrity of said spherical inter-surface of said chamber, a gas inlet regulating valve and duct for conducting a regulated flow of gas through said housing to said upper hemispheric portion, a gas duct within said housing for passing said gas from said upper hemispheric portion to said lower hemispheric portion, a gas outlet duct for carrying said gas away fro msaid lower hemispheric portion, and a door attached with a gas tight fit to haid housing permitting access to and replacement of said diaphragm.

3. A four pi proportional gas flow counter for testing radioactive samples comprising a housing formed from electrically conducting material having a spherical counting chamber therein, a pair of spaced apart anodes supported within said chamber by connectors, said connectors being electrically insulated from said anodes and attached to said housing, means for electrically grounding said housing and said connectors, means including said connectors for attaching said anodes to a high voltage source, a diaphragm having a low absorption cross-section being removably mounted upon a ring shaped holder, said radioactive samples being deposited directly onto said diaphragm, a recess encircling the spherical innersurface of said chamber for supporting said ring shaped holder in a position between said electrodes that partitions said chamber into an upper hemispheric portion and a lower hemispheric portion, a slot in said housing communicating with said recess in said chamber to facilitate removal of said ring shaped holder from said chamber while substantially maintaining the integrity of said spherical inter-surface of said chamber, a gas inlet regulating valve and duct for conducting a regulated flow of gas through said housing to said upper hemispheric portion, a gas duct within said housing for passing said gas from said upper hemispheric portion to said lower hemispheric portion, a gas outlet duct for carrying said gas away from said lower hemispheric portion, and a door attached with a gas tight fit to said housing permitting access to and replacement of said diaphragm.

4. A four pi proportional gas flow counter for testing radioactive samples comprising a housing formed from electrically conducting material having a spherical counting chamber therein, a pair of spaced apart anodes supported within said chamber by connectors, said connectors being electrically insulated from said anodes and attached to said housing, means for electrically grounding said housing and said counters, means including said connectors for attaching said anodes to a high voltage source, a diaphragm having a low absorption cross-section being removably mounted upon a ring shaped holder, said radioactive samples being deposited directly onto said diaphragm, a recess encircling the spherical inter-surface of said chamber for supporting said ring shaped holder in a position between said electrodes that partitions said chamber into an upper hemispheric portion and a lower hemispheric portion, a slot in said housing communicating with said recess in said chamber to facilitate removal of said ring shaped holder from said chamber while substantially maintaining the integrity of said spherical inter-surface of said chamber, a gas inlet regulating valve and duct for conducting a regulated flow of gas through said housing to said upper herispheric portion, a gas duct within said housing for passing said gas from said upper hemispheric portion to said lower hemispheric portion, a gas outlet duct for carrying said gas away from said lower hemispheric portion, a door attached to said housing permitting access to and replacement of said diaphragm, said door having an indenture into which said diaphragm holder protrudes when said door is closed, said door when closed providing a gas type seal and said gas type seal being provided by an O-ring set in an O-ring groove in said door.

UNITED STATES PATENTS

References Cited in the file of this patent 2,490,298    Ghiorso et al.  ----------  Dec. 6, 1949

(Other references on following page)

UNITED STATES PATENTS

| | | |
|---|---|---|
| 2,590,925 | Borkowski | Apr. 1, 1952 |
| 2,597,535 | Segre | May 20, 1952 |
| 2,598,215 | Borkowski | May 27, 1952 |
| 2,622,208 | Bernstein et al. | Dec. 16, 1952 |
| 2,684,447 | Gilky | July 28, 1954 |
| 2,743,372 | Browne et al. | Apr. 24, 1956 |

OTHER REFERENCES

Seliger et al.: Journal of Research, National Bureau of Standards, vol. 47, pages 41–44, Research Paper 2226, July 1951.

Schwebel et al.: Nucleonics, vol. 12, pages 54–57, July 1954.

USAEC Radiation Instrument Catalog RIB-8, Catalog No. 3 (Supplement No. 1), July 1, 1953, Radiation Instruments Branch Division of Biology and Medicine, Technical Information Service, Oak Ridge, Tennessee; pages AL-35A (Supplement 1, July 1, 1953), and AL-38A (Supplement 2, July 1, 1954).